United States Patent [19]

Barkus et al.

[11] Patent Number: 5,211,441
[45] Date of Patent: May 18, 1993

[54] HINGED BOWS USED TO SUPPORT TARPAULIN ON TRAILERS

[75] Inventors: Aaron J. Barkus, Augusta; Virgil E. Royer, Wichita; Robert A. Landers, Wichita; Steven D. Snyder, Wichita, all of Kans.

[73] Assignee: Ritchie Sand, Inc., Whichita, Kans.

[21] Appl. No.: 926,943

[22] Filed: Aug. 10, 1992

[51] Int. Cl.⁵ .............................................. B60J 7/00
[52] U.S. Cl. .................................... 296/104; 296/98; 296/100
[58] Field of Search ................... 296/104, 102, 98, 100

[56] References Cited

U.S. PATENT DOCUMENTS

| | | | |
|---|---|---|---|
| 3,226,153 | 12/1965 | Haid | 296/104 |
| 3,894,766 | 7/1975 | Woodward | 296/104 |
| 4,236,748 | 12/1980 | Cloutier et al. | 296/104 X |
| 4,854,633 | 8/1989 | Kroft et al. | 296/104 |
| 4,915,439 | 4/1990 | Cramaro | 296/98 |

Primary Examiner—Robert R. Song

[57] ABSTRACT

Tarpaulin support bows are provided on a vehicle trailer or bed for supporting the tarpaulin which covers the material being hauled on the vehicle. The support bows are hingedly mounted so they are able to move when they are contacted by a material loading bucket or compacted material. The movement of the support bows reduces the opportunity for damage or breakage of the bows or the vehicle sideboards to which the bows are mounted.

20 Claims, 2 Drawing Sheets

U.S. Patent          May 18, 1993          Sheet 1 of 2          5,211,441
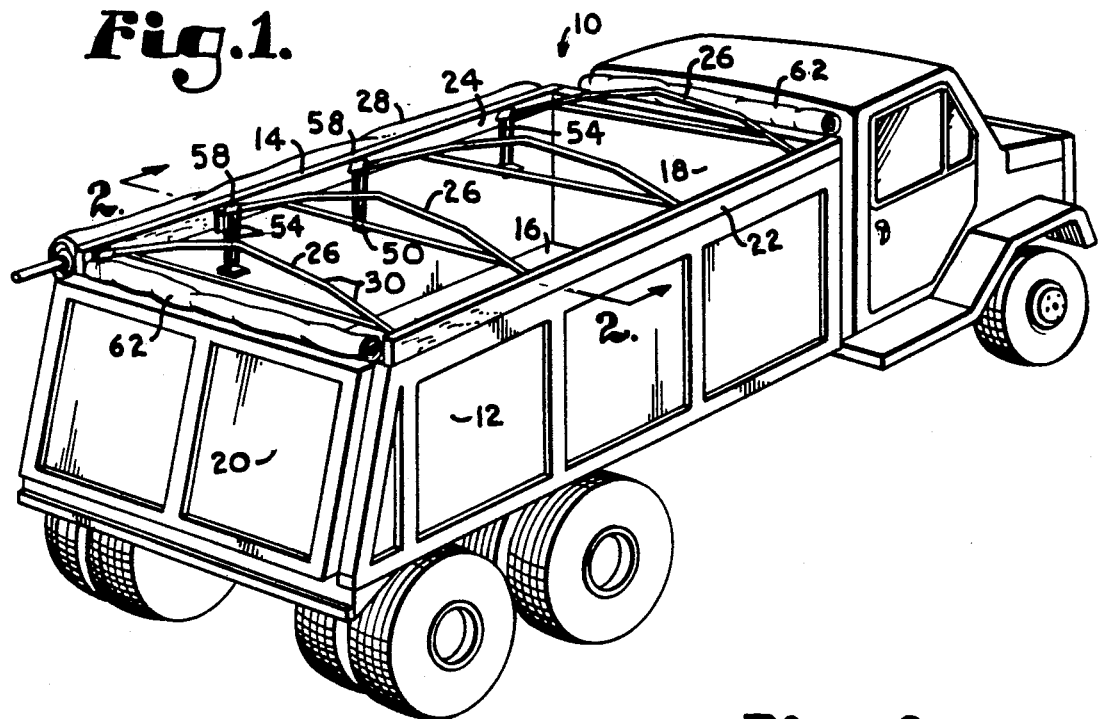
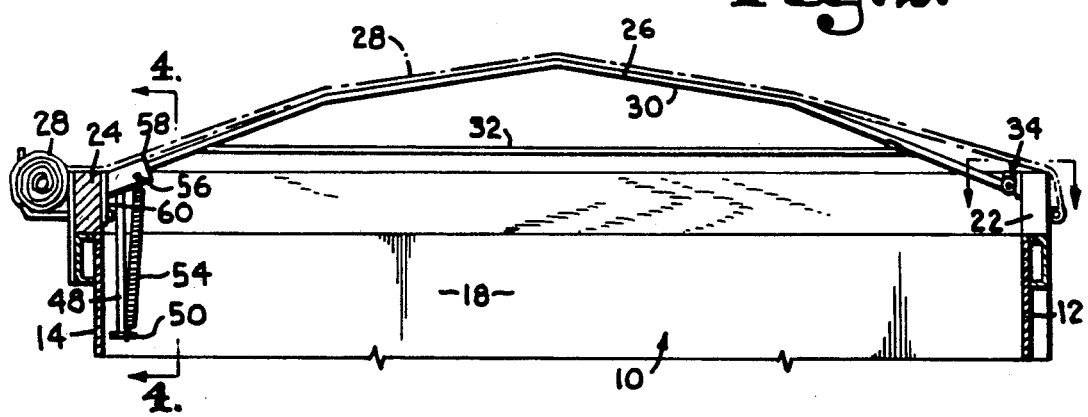
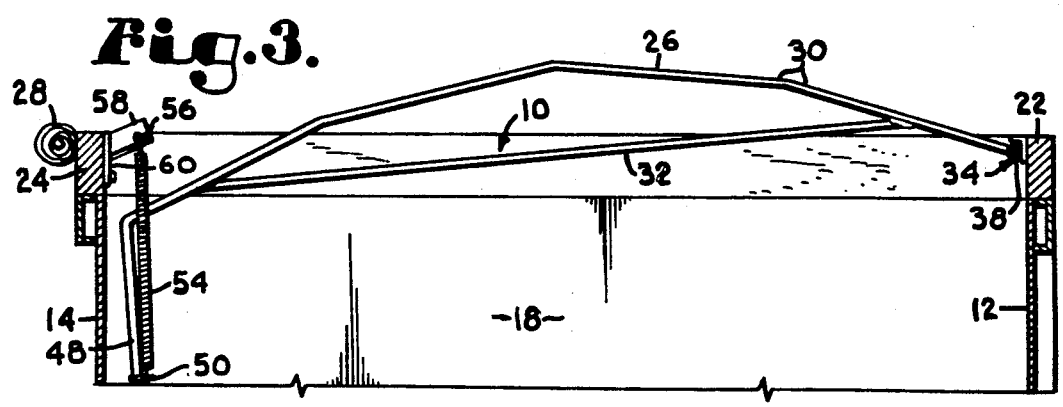

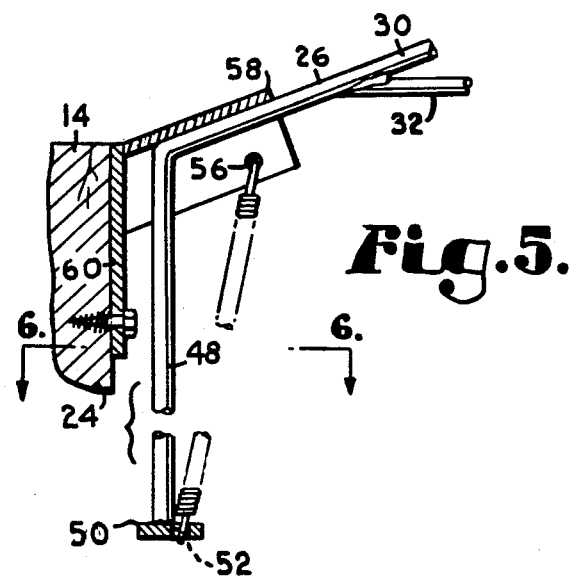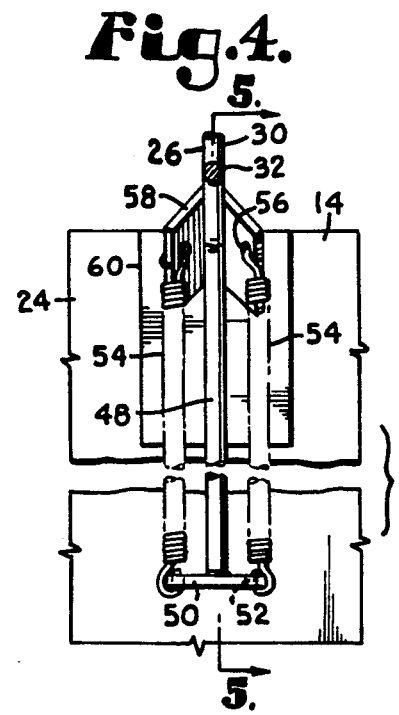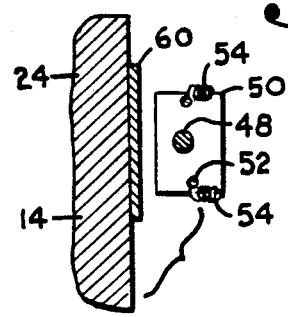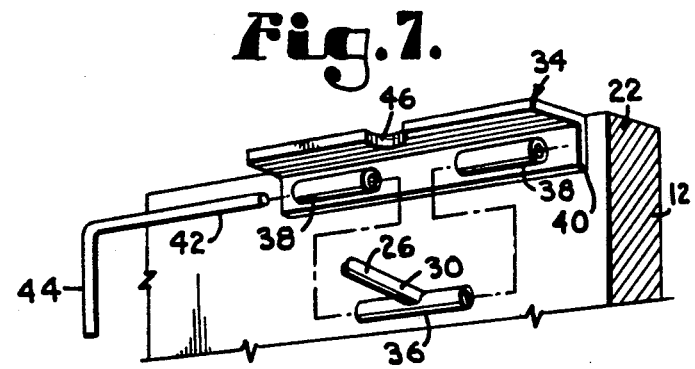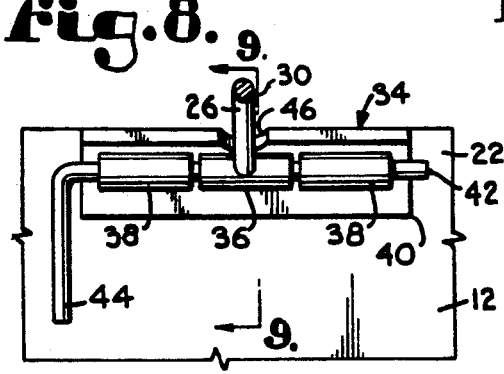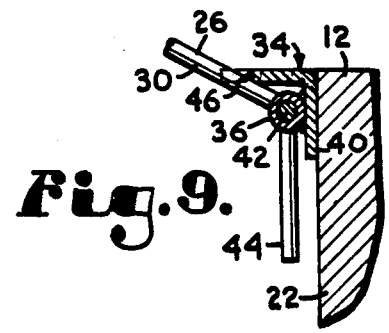

HINGED BOWS USED TO SUPPORT TARPAULIN ON TRAILERS

BACKGROUND OF THE INVENTION

The present invention relates in general to material hauling vehicles, and, more particularly, to devices for supporting a tarpaulin used to cover the material on the vehicle.

A tarpaulin is frequently used to cover materials such as rock, sand, dirt and grain which are being hauled on a vehicle bed or trailer to prevent the material from flying off of the moving vehicle and causing damage to other vehicles. Arched supports or bows which extend between the siderails of the vehicle trailer are typically used to support the tarpaulin when it is applied over the load. Bows of this type prevent the tarpaulin from being damaged by contact with the material and cause the tarpaulin to have an arched profile which readily sheds rainwater and helps to keep the material dry.

A particularly troublesome problem that has arisen from the use of the arched support bows is they are frequently damaged when the material is being loaded into the vehicle bed or trailer. The damage can occur if a front end loader bucket should contact the bows or if compacted portions of the material impact the bows as the material is being loaded into the trailer. The damaged bows must then be repaired or replaced, usually at frequent intervals and at significant cost. If the vehicle operator should fail to notice that a bow has been broken or if the bow should be broken while the vehicle is away from a repair facility, the tarpaulin can be easily punctured by the broken bow. In addition to the damage which can be caused to the bows and the tarpaulin, the material loading process may cause the vehicle sideboards to be broken if the bows are impacted with a sufficient force.

Because of the risk of damage to the support bows and sideboards during loading of material into the vehicle, the vehicle operator will sometimes climb into the trailer and remove the bows prior to loading and then replace the bows before the tarpaulin is placed over the loaded material. Removal and replacement of the bows causes significant delays in the loading process and is also objectionable from a safety standpoint as it subjects the operator to a risk of slipping and falling while climbing into or out of the trailer or vehicle bed.

SUMMARY OF THE INVENTION

It is an object of this invention to provide tarpaulin support bows which are less likely to be damaged during the loading of material into a vehicle bed or trailer so that the costs associated with the repair and replacement of the bows are substantially reduced.

It is also an object of this invention to provide a tarpaulin support bow which is able to absorb an impact such as from a high-loader bucket or compacted material so that the incidence of damage to either the support bow or the vehicle sideboards is substantially eliminated.

It is another object of this invention to provide a support bow for supporting a tarpaulin in an arched configuration above a material load to prevent damage to the tarpaulin by the material and to allow the tarpaulin to shed water to keep the material dry, and which bow is able to absorb an impact during loading of the material so that the bow does not break and cause puncturing of the tarpaulin.

It is a further object of this invention to provide a tarpaulin support bow which is hingedly mounted to absorb an impact without being damaged or broken so that the bow does not have to removed prior to the material loading process and then replaced when loading has been completed, thereby eliminating the opportunity for injury to the vehicle operator during removal and replacement of the bow.

To accomplish these and other related objects, the invention in accordance with the present invention is directed a device for supporting a tarpaulin overlying a vehicle bed or trailer, said device comprising:

a support member having first and second ends and having a length sufficient to substantially span the distance between opposed sides of the vehicle bed or trailer;

a hinge coupled with the first end of the support member for coupling with one side of the vehicle bed or trailer to permit swinging movement of the support member about a pivot axis in response to a downward directional force impacting the support member; and a biasing member coupled with the support member for urging the support member in an upward direction to return the support member to a normal position after said swinging movement in response to the downward directional force.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of a vehicle employing hinged bows in accordance with the present invention for supporting a tarpaulin over a bed or trailer of the vehicle;

FIG. 2 is a fragmentary elevational view of the trailer taken in vertical section along line 2—2 of FIG. 1 in the direction of the arrows and with phantom lines showing the tarpaulin applied over the bows to cover the trailer;

FIG. 3 is a fragmentary elevational view of the trailer similar to the view shown in FIG. 2 but with the bow shown pivoted downward in response to application of a downward force to the bow;

FIG. 4 is a fragmentary side elevational view of an end of one of the bows taken in vertical section along line 4—4 of FIG. 2 and illustrating the biasing springs used to maintain the bow in a normal position in which they support the tarpaulin;

FIG. 5 is a fragmentary front elevational view of the end of the bow shown in FIG. 4 and taken in vertical section along line 5—5 of FIG. 4 in the direction of the arrows;

FIG. 6 is a top plan view of the end of the bow taken in horizontal section along line 6—6 of FIG. 5 in the direction of the arrows;

FIG. 7 is an exploded fragmentary perspective view of the other end of the bow and showing the hinge used to connect it to the sideboard of the trailer;

FIG. 8 is a side elevational view of the fragmentary end of the bow and the hinge; and FIG. 9 is a front elevational view of the bow end and hinge, taken in vertical section along line 9—9 of FIG. 8.

DESCRIPTION OF THE PREFERRED EMBODIMENT

Referring now to the drawings in greater detail, and initially to FIG. 1, a vehicle comprising an end dump trailer is represented broadly by the numeral 10. Trailer 10 is of the type designed for hauling various materials such as, but not limited to, sand, gravel, limestone screenings and the like. Trailer 10 includes opposed upright sides 12 and 14, a floor 16, a forward end 18 and a rear dump gate 20. Sideboards 22 and 24 are secured to the top of trailer sides 12 and 14 in a generally known fashion.

Turning additionally to FIGS. 2 and 3, in accordance with the present invention, a plurality of spaced apart supports or bows 26 extend between the sides 12 and 14 of trailer 10 at positions to provide support to a tarpaulin 28 which is used to cover the trailer 10. The spacing between adjacent bows 26 can be varied as is required for particular applications but typically will be on the order of four to five feet. Each bow 26 comprises an elongated arched member 30 and a reinforcing brace 32 which is welded or otherwise secured to the arched member 30 for strengthening purposes. The arched member 30 and brace 32 may be formed from any of various materials having the necessary strength.

One end of each bow 26 is mounted to sideboard 22 by a hinge 34 which permits up and down pivoting movement of the bow. As is best shown in FIGS. 7-9, hinge 34 is formed by a barrel 36 which is transversely mounted to the end of arched member 30 and is received between a pair of spaced apart barrels 38 which are mounted to a length of angle iron 40. A hinge pin 42 extends through the barrels 36 and 38 and includes a curved handle 44 at one end to facilitate removal of the pin 42 when disassembly of the hinge 34 is desired. The angle iron 40 is suitably secured to the sideboard 22, preferably near a top edge thereof. A cutout 46 is provided in the top flange of angle iron 40 to seat the arched member 30. The cutout 46 thus serves to maintain the bow 26 in the desired alignment.

As is shown in FIGS. 4-6, the other end of each bow 26 is coupled with the opposite sideboard 24 in a manner which allows downward pivoting of the bow 26 about the axis of hinge pin 42. A downwardly extending extension 48 is provided at the end of arched member 30 opposite from that coupled with hinge 34 and mounts a transverse plate 50 at a bottom end thereof. The plate 50 includes an opening 52 on both sides of the extension 48 and each opening 52 receives a looped end of a spring 54. The other looped end of each spring 54 is connected to an opening 56 provided in a stop 58 which is formed of angle iron and is welded to a mounting plate 60. The mounting plate 60 is secured to sideboard 24 by suitable means and is positioned to place the stop 58 near the top of sideboard 24 where it receives the arched member 30 of bow 26.

The springs 54 operate to maintain the arched member 30 in a normal tarpaulin supporting position by exerting an upward biasing force on the arched member 30 to maintain it in engagement with the stop 58. Notably, the springs 54 permit downward pivoting of the arched member 30 when a downward force applied to the arched member 30 overcomes the upward biasing force exerted by the springs. In addition, the placement of the springs 54 on both sides of the bow extension 48 causes the arched member 30 to be maintained between the springs 54 as it pivots up and down. The springs 54 thus ensure that the arched member 30 is guided back to its normal position seated against the stop 58 after the downward force has been removed from the arched member.

As can be seen in FIG. 1, in addition to tarpaulin 28 which is applied over substantially the entire length of trailer 10, a pair of end tarps 60 may be suitably secured at opposite ends of the trailer 10 to provide complete coverage over the material carried by the trailer.

In use, the bows 26 are utilized to provide support for the tarpaulin 28 which is used to cover the material being hauled in the trailer 10. The tarpaulin 28 serves primarily to prevent particulate material from blowing off of the trailer 10 as the trailer travels along a road, particularly a highway. The bows 26 also maintain the tarpaulin 28 in an arched configuration which facilitates the shedding of water.

In accordance with the invention and as illustrated in FIG. 2, the bows 26 are able to pivot downwardly from their normal operating position with the arched members 30 seated against the associated stops 58 by the biasing forced exerted by springs 54. This pivoting movement allows the bows 26 to remain undamaged during the loading of material into the trailer 10. For example, if the bucket of a front end loader should contact one or more bows 26 as it is dumping material into the trailer, the bows 26 will simply deflect downwardly about the horizontal axis of hinge pins 42 and will return to their normal positions when the bucket is removed. Likewise, if compacted material should impact against a bow 26 during loading, the bow 26 will simply pivot downwardly and will then be returned to the seated position against stop 58. The springs 54 desirably can be extended sufficiently to permit the bow extension 48 to contact the floor 16 upon the application of a sufficient downward force.

Advantageously, the placement of springs 54 on opposite sides of the arched member 30 ensures that the bow is returned into engagement with stop 58 when the downward force is removed. The springs 54 act as guides which contact the arched member 30 of the bow 26 and direct it back to a seated position against the stop 58. This is particularly important if the bow should be knocked either a fore or aft direction by the bucket or compacted material.

In comparison to conventional bows which are fixed at both ends to the vehicle sideboards, the hinged bows 26 of the present invention are far less likely to be damaged or cause damage to the sideboards 22 and 24 during loading of the material. The ability of the bows 26 to absorb an impact, such as from a front end loader bucket or other device, allows the bows to be left on the trailer 10 loading, thus eliminating the hazardous practice of removing and replacing the bows during the loading process. Notably, when tarpaulin 28 is of the type which can be positioned from the ground by the vehicle operator, the loading process can be accomplished without requiring the operator to climb into the trailer 10.

It will be appreciated that the bows 26 can be used with other vehicle types such as on the bed of grain trailers and the like. This is contemplated by and is within the scope of the invention.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A device for supporting a tarpaulin overlying a vehicle bed or trailer, said device comprising:
    a support member having first and second ends and having a length sufficient to substantially span the distance between opposed sides of the vehicle bed or trailer;
    a hinge coupled with the first end of the support member for coupling with one side of the vehicle bed or trailer to permit swinging movement of the support member about a pivot axis in response to a downward directional force impacting the support member; and
    a biasing member coupled with the support member for urging the support member in an upward direction to return the support member to a normal position after said swinging movement in response to the downward directional force.

2. The device as set forth in claim 1, wherein the biasing member is mounted at the second end of the support member.

3. The device as set forth in claim 2, wherein said biasing member comprises a spring having one end coupled with the second end of the support member and another end for coupling with the other side of the vehicle bed or trailer.

4. The device as set forth in claim 3, including a downwardly extending extension connected to the second end of the support member and wherein the spring is connected to the extension.

5. The device as set forth in claim 4, wherein said extension includes a mounting bracket at a free end thereof and wherein said one end of the spring is connected to the mounting bracket.

6. The device as set forth in claim 5, including a second spring connected to the mounting bracket and wherein said first and second springs extend along opposite sides of the extension at positions for directing the support member to the normal position after said swinging movement.

7. The device as set forth in claim 6, wherein said pivot axis is a substantially horizontal axis.

8. An apparatus mounted on a vehicle bed or trailer for supporting a tarpaulin, said apparatus comprising:
    a support member extending between opposed walls of said vehicle bed or trailer and being hingedly mounted at a first end to one of said walls for downward swinging movement about a pivot axis;
    a biasing member coupled with the support member and exerting an upwardly biasing force on said support member; and
    a stop mounted on the other of said opposed walls for receiving an opposite end of said support member, said stop positioned for restricting upward movement of said support member but permitting downward movement thereof, whereby said support member can be moved downwardly upon application of a downward force to the support member and is returned by the upward biasing force into engagement with the stop when the downward force is removed.

9. The apparatus as set forth in claim 8, wherein the biasing member is mounted at a second end of the support member.

10. The apparatus as set forth in claim 9, wherein said biasing member comprises a spring having one end coupled with the second end of the support member and another end coupled with the stop.

11. The apparatus as set forth in claim 10, including a downwardly extending extension connected to the second end of the support member and wherein said one end of the spring is connected to the extension.

12. The apparatus as set forth in claim 11, wherein said extension includes a mounting bracket at a free end thereof and wherein said one end of the spring is connected to the mounting bracket.

13. The apparatus as set forth in claim 12, including a second spring connected between the mounting bracket and the stop and wherein said first and second springs extend along opposite sides of the extension at positions for directing the support member to the normal position after said swinging movement.

14. The apparatus as set forth in claim 13, wherein said pivot axis is a substantially horizontal axis.

15. Apparatus coupled with a vehicle bed or trailer for supporting a tarpaulin over the bed or trailer, said apparatus comprising:
    a hinged support extending between opposed walls of said vehicle bed or trailer and mounted on one of said opposed walls, said support being moveable in a downward direction from a normal position in response to application of a downward force to the support; and
    a biasing member coupled with the support and exerting an upward biasing force on the support to maintain the support in a normal position for supporting said tarpaulin and for returning the support to said normal position following removal of the downward force.

16. The apparatus as set forth in claim 15, including a hinge mounting one end of the support to one of the opposed walls and a stop mounted on the other of said opposed walls for receiving an opposite end of said support, said stop positioned for restricting upward movement of said support but permitting downward movement thereof, whereby said support can be moved downwardly upon application of a downward force to the support and is returned by the upward biasing force into engagement with the stop when the downward force is removed.

17. The apparatus as set forth in claim 16, wherein the biasing member is mounted at said opposite end of the support.

18. The apparatus as set forth in claim 9, wherein said biasing member comprises a first spring and a second spring, both first and second springs having one end coupled with said opposite end of the support and another end coupled with the stop, said first and second springs extending along opposite sides of the extension at positions for directing the support member to the normal position after said downward movement.

19. The apparatus as set forth in claim 10, including a downwardly extending extension connected to said opposite end of the support and wherein said one end of the first and second springs are connected to the extension.

20. The apparatus as set forth in claim 11, wherein said extension includes a mounting bracket at a free end thereof and wherein said one end of the first and second springs are connected to the mounting bracket.

* * * * *